(No Model.)

G. F. KURSH.
LINK FOR SLEEVE OR CUFF BUTTONS.

No. 501,725. Patented July 18, 1893.

WITNESSES:
O. F. Eagles.
L. Douville.

INVENTOR
George F. Kursh.
BY
ATTORNEY.

UNITED STATES PATENT OFFICE.

GEORGE F. KURSH, OF PHILADELPHIA, PENNSYLVANIA.

LINK FOR SLEEVE OR CUFF BUTTONS.

SPECIFICATION forming part of Letters Patent No. 501,725, dated July 18, 1893.

Application filed July 11, 1892. Serial No. 439,569. (No model.)

*To all whom it may concern:*

Be it known that I, GEORGE F. KURSH, a citizen of the United States, residing in the city and county of Philadelphia, State of Pennsylvania, have invented a new and useful Improvement in Links for Sleeve or Cuff Buttons, &c., which improvement is fully set forth in the following specification and accompanying drawings.

My invention consists of a link for sleeve or cuff buttons, &c., formed of parts as herein described which are reliably held in closed condition, and may be readily opened to admit the removal of buttons, &c., as will be hereinafter more fully set forth.

Figure 1:
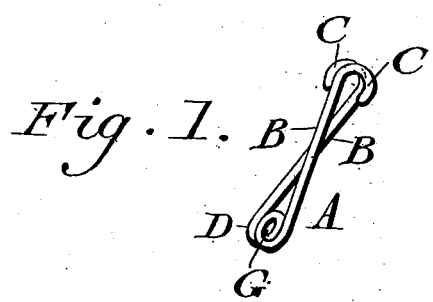
Figure 2:
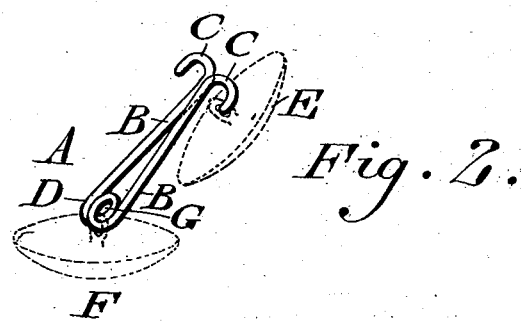
Figure 3:
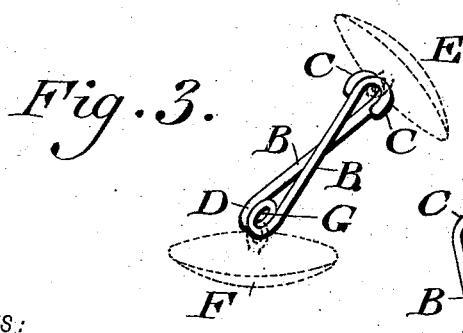
Figure 4:
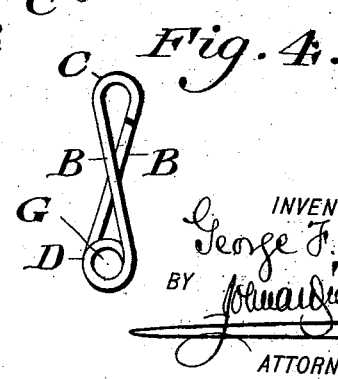

Figure 1 represents a perspective view of a link embodying my invention. Fig. 2 represents a perspective view of the same in open condition. Fig. 3 represents a perspective view thereof, with attached button, shown in dotted lines. Fig. 4 represents a side elevation thereof.

Similar letters of reference indicate corresponding parts in the several figures.

Referring to the drawings: A designates a link which is formed of wire or other suitable metal or material, the same being formed of the shanks B, one end of each of which is provided with a hook C. The other ends of said shanks are connected by a coil D, which forms a spring for holding the hooks in closed condition, it being noticed that the hook on one shank B extends to the right thereof, and that of the other shank extends to the left, and the hook of one shank closes against the opposite shank.

The operation is as follows: When it is desired to attach the button E, shown in dotted lines, to the link, the shanks B are pressed toward each other, whereby the hooks recede from each other, as shown in Fig. 2. The eye of the button is now slipped on one hook, worked over the same upon the shank B continuous thereof, when the shanks are let go and the link closes. The eye may now be slipped over both hooks and thus the button is retained in position thereon, the hooks remaining securely closed owing to the action of the spring coil D. The opposite button F, shown in dotted lines, is designed to remain on the coil, D as a fixture, said coil providing an eye G for such purpose. In order to remove the button, the eye of the same is moved off from the two hooks and slipped upon one of the shanks after which the shanks are pressed toward each other and the button operated to draw the eye over one of the hooks, the hooks being sufficiently separated in lateral direction to permit said eye to pass between the same, it being evident that when the eye has fully traversed the hook upon which it slides, it reaches the end of the same, and is consequently clear thereof and so removed. The shanks are again let go, when they return to their normal positions, and the hooks are again in closed position.

Having thus described my invention, what I claim as new, and desire to secure by Letters Patent, is—

Two cuff buttons having a connecting link consisting of a single piece of material formed with a coiled spring at one end, engaging the eye of one of the buttons, and having crossed shanks with oppositely formed hooked ends, producing a loop engaging the eye of the other button, said coil spring normally closing said hooked ends, so as to form said loop, said parts being combined substantially as described.

GEORGE F. KURSH.

Witnesses:
JOHN A. WIEDERSHEIM,
R. H. GRAESER.